US011159425B2

(12) United States Patent
Chen

(10) Patent No.: US 11,159,425 B2
(45) Date of Patent: Oct. 26, 2021

(54) ADAPTIVE IPV4 ADDRESS POOL

(71) Applicant: Abraham Y Chen, New York, NY (US)

(72) Inventor: Abraham Y Chen, New York, NY (US)

(*) Notice: Subject to any disclaimer, the term of this patent is extended or adjusted under 35 U.S.C. 154(b) by 0 days.

(21) Appl. No.: 15/727,541

(22) Filed: Oct. 6, 2017

(65) Prior Publication Data

US 2019/0109786 A1    Apr. 11, 2019

(51) Int. Cl.
*H04L 12/741*    (2013.01)
*H04L 12/947*    (2013.01)

(52) U.S. Cl.
CPC .............. *H04L 45/74* (2013.01); *H04L 49/25* (2013.01)

(58) Field of Classification Search
CPC ................................ H04L 45/74; H04L 49/25
See application file for complete search history.

(56) References Cited

U.S. PATENT DOCUMENTS

| | | | | |
|---|---|---|---|---|
| 6,731,642 B1* | 5/2004 | Borella | ............. | H04L 29/12009 370/356 |
| 7,260,649 B1* | 8/2007 | Somasundaram | ........................... | H04L 29/12415 709/245 |
| 8,693,323 B1* | 4/2014 | McDysan | ............... | H04L 45/50 370/230 |
| 2013/0215825 A1* | 8/2013 | Hsu | ....................... | H04W 88/06 370/328 |
| 2014/0269495 A1* | 9/2014 | Frantz | .................. | H04W 48/18 370/328 |

* cited by examiner

*Primary Examiner* — Luat Phung

(57) ABSTRACT

A method, based on operations of parsing a set into two subsets and then multiplying elements of one subset by those of the other subsets, for expanding the assignable Internet IPv4 public address pool consists of introducing a new category of routers, named Semi-Public Router (SPR), utilizing addresses within a reserved address block by transporting such as data via an existing mechanism within the IPv4 protocol. Each SPR is to be deployed inline between an Edge Router and a subscriber premises that it serves, resulting in the additional addressing capacity for serving many more subscribers. This enhanced operation is fundamentally transparent to current Internet equipment. Consequently, existing routers are not affected, thus no modification is imposed on their current practices.

13 Claims, 4 Drawing Sheets

|   | 0 1 2 3 | 4 5 6 7 | 8 9 0 1 2 3 4 5 | 6 7 8 9 0 1 2 3 4 5 6 7 8 9 0 1 |
|---|---|---|---|---|
| 1 | Version | IHL (5) | Type of Service | Total Length (20) |
| 2 | Identification | | | Flags | Fragment Offset |
| 3 | Time to Live | | Protocol | Header Checksum |
| 4 | Source Host Number ← 301 | | | |
| 5 | Destination Host Number ← 302 | | | |

FIG.3

|   | 0                       | 1                       | 2                       | 3           |
|---|-------------------------|-------------------------|-------------------------|-------------|
|   | 0 1 2 3 4 5 6 7 8 9 | 0 1 2 3 4 5 6 7 8 9 | 0 1 2 3 4 5 6 7 8 9 | 0 1 |
| 1 | Version | IHL (8) | Type of Service | Total Length (32) | |
| 2 | Identification | | Flags | Fragment Offset |
| 3 | Time to Live | Protocol | Header Checksum | |
| 4 | Source Host Number ← 411 | | | |
| 5 | Destination Host Number ← 412 | | | |
| 6 | EzIP ID (Source) (0X9A) | EzIP Option Length (6) | Extended Source No. -1 ← 401 | Extended Source No. -2 ← 402 |
| 7 | Extended Source No. -3 ← 403 | Extended Source No. -4 ← 404 | EzIP ID (Destination) (0X9A) | EzIP Option Length (6) |
| 8 | Extended Destination No. -1 ← 405 | Extended Destination No. -2 ← 406 | Extended Destination No. -3 ← 407 | Extended Destination No. -4 ← 408 |

FIG.4

ADAPTIVE IPV4 ADDRESS POOL

This present invention is the formal disclosure of a Provisional Patent Application No. 62/405,637, filed on Oct. 7, 2016 entitled ADAPTIVE IPv4 ADDRESS SPACE.

BACKGROUND OF THE INVENTION

1. Technical Field

This invention relates to the publicly assignable Internet address pool.

2. Description of the Related Art

The Internet is currently the main world-wide communication backbone. As in any similar facility, each terminal device wishing to communicate thru it must be distinguished from all others with a unique identification code. A good example is the Public Switched Telephone Network (PSTN). Each of its subscribers is assigned an individual telephone number. Since the PSTN was developed during the span of over one century, from original direct connections, expanded through local and regional services, to currently providing international connectivity, the telephone numbers evolved accordingly by prefixing the local phone numbers with additional codes to represent cities, regions and countries, etc., progressively. Following this practice, the available telephone numbers have been able to keep in pace with the expansion of the PSTN.

Riding on the PSTN facility to get started, the Internet was capable of world-wide coverage right from the beginning. However, its identification facility consists of only a finite 32 bit binary number set, called IPv4 (Internet Protocol version 4). Grouping into four octets with eight bits each, this facility has a maximum combination of 4,294,967,296 (calculated from 256×256×256×256), or 4.295B (billion) addresses. Using the binary notation of 64K (thousand) representing 256×256 (actual value being 65,536), the size of this address pool may be expressed as 4,096M (million) or 4.096B (billion). These are too few compared to the expected world-wide population and connected devices (often called as IoTs—Internet of Things) of 7.6B and 50B, respectively, by Year 2020, according to a Cisco forecast.

Numerous techniques have been attempted to relieve this disparity. Two most effective ones are DHCP (Dynamic Host Configuration Protocol) and CG-NAPT (Carrier Grade Network Address to Port Translation, often shortened to CG-NAT) provided by Internet Service Providers (ISPs).

By assigning Internet addresses only to active IoTs, the former scheme reduces the size of the address pool needed for actual operation. The latter scheme assigns, also dynamically, one port number to each active Internet session of an IoT. This allows not only each IoT to have multiple simultaneous sessions such as browsing several websites while exchanging eMails, but also a subscriber to have multiple IoTs. Although these schemes significantly relieved the urgency for assignable addresses, they can not provide the unique identification code required for each IoT to communicate with others as an individual entity. Since Internet promotes always-on services, more and more IoTs are online constantly, straining these two schemes. The dynamic nature of these configurations prevent arbitrary direct connections among IoTs in the traditional sense of making a call to any phone number around the world thru the PSTN, whenever desired. Additionally, the none-static nature of these schemes renders the association of a data packet to a specific IoT extremely difficult, if not impossible, especially for forensic purposes. This hurdle in tracing a date packet to the source of a security breach exposed the fundamental vulnerability of the internet to the intrusions.

A newer version of the Internet Protocol, IPv6 with 128 bit capacity has been in development for quite sometime, and its deployment began nearly a decade ago. Although capable of resolving the IPv4 address shortage, the general acceptance of it has been quite sluggish so far, as evidenced by regularly updated world-wide statistics, such as "IPv6 Capable Rate by Country (%)" by APNIC (Asia Pacific Network Information Center) and "Statistics—sFlow Statistics—Ether Type" by AMS-IX (AMSterdam Internet eXchange). The former shows that most countries are not ready for IPv6. The latter shows that IPv6 currently carries less than 2% of the Internet traffic. The net effect is that most Internet data packets today are carried by the IPv4 protocol.

Many emerging countries around the world are caught in between. They could not roll out their essential Internet services because most of the IPv4 addresses have already been assigned to more developed regions. On the other hand, they are having a hard time to deploy the IPv6, perhaps due to the complexity and cost involved.

A recent study of the IPv4 protocol revealed a rather concise scheme that can not only overcome its current shortage of address, but also create many times more addresses as its reserve. This enhancement may be implemented as an incremental adjunct module to interoperate with the existing Internet equipment, without imposing changes to the latter.

SUMMARY OF THE INVENTION

It is therefore the object of the present invention to achieve the combined goals of expanding the assignable public IPv4 address pool for the immediate need, creating a sufficient reserve for the foreseeable future, utilizing existing design to realize these, while minimizing disturbance to current Internet equipment and practices, streamlining the IP address administration thus mitigating the root cause to cyber security vulnerability.

BRIEF DESCRIPTION OF THE DRAWINGS

FIG. 3 is the generic IPv4 IP (Internet Packet) Header format. Rows (Words) 4 and 5 carry the Source and Destination Host Numbers (addresses) indicating where a packet is originated from and delivered to, respectively. Note that Words 1 thru 3 are formality overhead of an IP Header. They do not contribute to the understanding of the incident invention.

FIG. 4 is an EzIP Header based on FIG. 3, appended with Words 6 through 8 called options words, to transport the proposed extension address data as the header's payload. That is, as opposed to Words 4 and 5 which are recognized by all routers as addresses, the contents in these three added Words are treated as general data by existing public and private routers, because they were designed without any knowledge of the EzIP technique. Note that the first half of Word 6 and the second half of Word 7 are the options word formality overhead for alerting an SPR to take the appropriate actions.

DETAILED DESCRIPTION OF THE INVENTION

Figure 1:
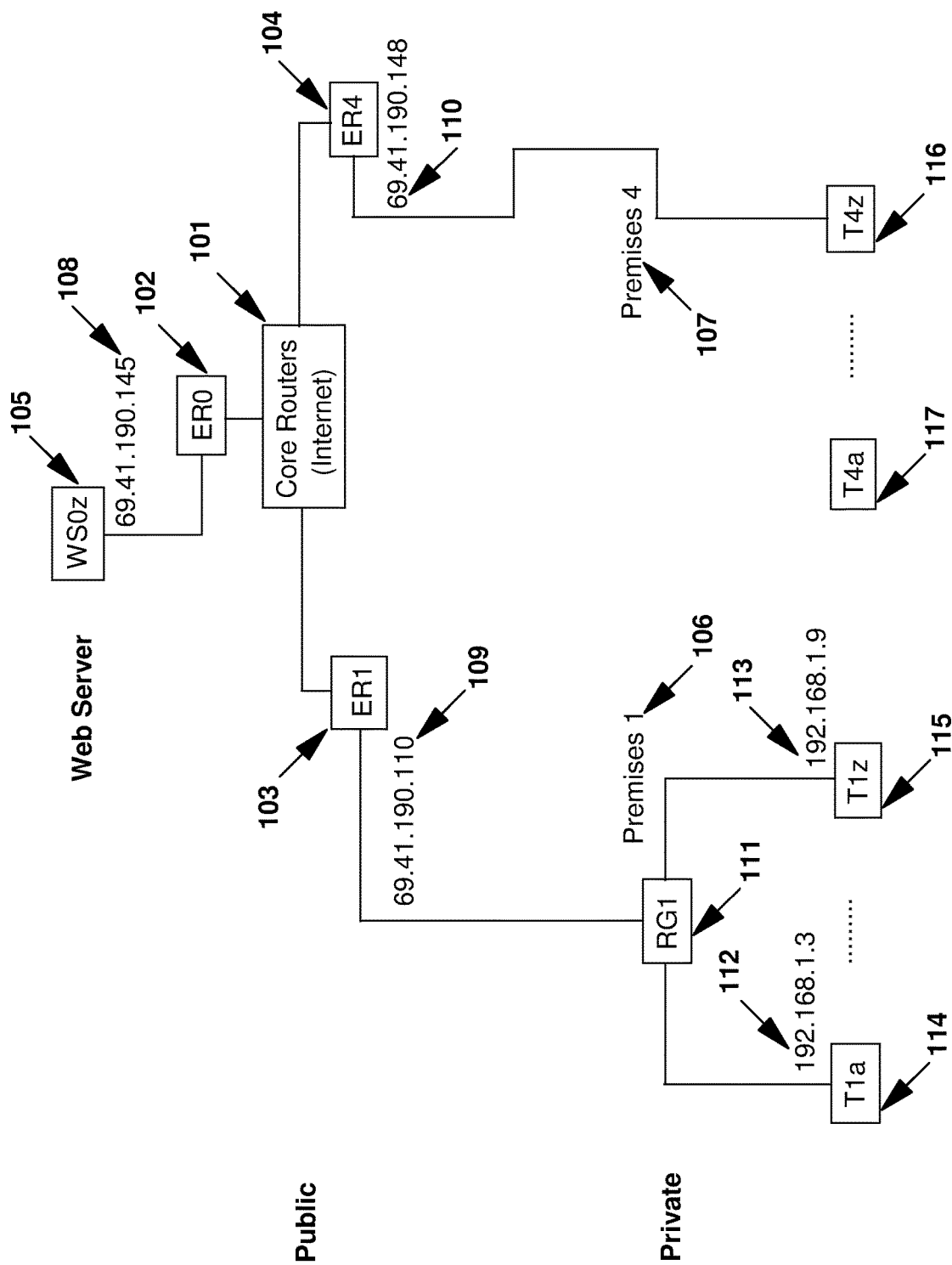
FIG. 1 is an architectural overview of the current Internet, operating with two categories of routers, public and private, according to the category of IP addresses they operate with. The public routers include the Core Routers and ERs (Edge Routers). Together, they form the main fabric of the Internet. The private routers are Routing Gateways (RGs) that are installed on customer premises to handle the routing of packets within private networks, respectively.

FIG. 1 depicts the IPv4 (Internet Protocol version 4) based Internet system architecture. Core Routers 101 represents the collection of routers in the Internet that transport data packets among Edge Routers (ER), such as ER0 102, ER1 103 and ER4 104, etc. Each of these ERs serves one or more subscribers such as Web Server WS0z 105, Premises 1 106 and Premises 4 107, etc. Each of these subscribers is assigned with a public IP address such as 69.41.190.145 108, 69.41.190.110 109 and 69.41.190.148 110, respectively, for communication through the Internet. On Premises 1 106, the owner has a Routing Gateway RG1 111 utilizing addresses, 192.168.1.3 112, and 192.168.1.9 113 to identify IoTs, T1a 114 and T1z 115, respectively. On Premises 4 107, only one IoT, T4z 116 with assigned public address, 69.41.190.148 110, is directly connected to the Internet via ER4 104. The second IoT, T4a 117 having no assigned address is not connected to the Internet. The Web Server WS0z 105, although architecturally at the equivalent position as T4z 116, possesses a different operation characteristics. WS0z 105 is an information clearing facility for providing data to other IoTs, such as T1a 114, T1z 115, and T4z 116. Thus, WS0z 105 normally does not initiate any Internet session, but only responds to packets from IoTs requesting for information.

The addresses with leading value of "192.168" may be collectively represented by a netblock notation, 192.168/16, where "/16" indicates that the leading 16 bits of these addresses are used as the network identification. The remaining trailing 16 bits with 64K combination is available for the owner to assign to the IoTs on his premises. Together with two other similar netblocks, 172.16/12 and 10/8 (not shown), capable of supporting 1M and 16M addresses, respectively, on each network, these are defined under IPv4 as private addresses. The balance of the roughly 4,079M (4,096M-16M-1M-64K) combinations is defined generally as public addresses.

Upon reviewing the IANA (Internet Assigned Numbers Authority) IPv4 Address Space Registry, however, there is a fairly large 240/4 (240/8 thru 255/8) netblock consisting of 256M addresses that has been "RESERVD" for "Future use" since 1981-09. This reduces the available public portion of the IPv4 pool further down to only 3,823M (4,079M–256M) or 3.823B addresses that is only half of the expected world population by Year 2020, making the IPv4 address shortage issue even more severe than the common impression.

The IPv4 protocol specifies that Routing Gateways, such as RG1 111 only use private addresses, while Edge Routers, such as ER0 102, ER1 103 and ER4 104, etc. as well as Core Routers 101 use only public addresses. None of these is allowed to use the RESERVED 240/4 netblock. Thus, all are designed to reject packets with such addresses in the IP Header. On the other hand, these rules do not preclude a configuration whereby a new category of router, named Semi-Public router (SPR), being neither a public nor a private router, from making use of this 240/4 netblock to provide additional routing path. By deploying an SPR inline between an Edge Router (public) and a private premises as described herein, the goal of expanding the effective assignable public IPv4 address pool will be accomplished.

The description below will also disclose how to transport such address data through the existing routers stealthily to avoid disturbing their established operations.

Figure 2:
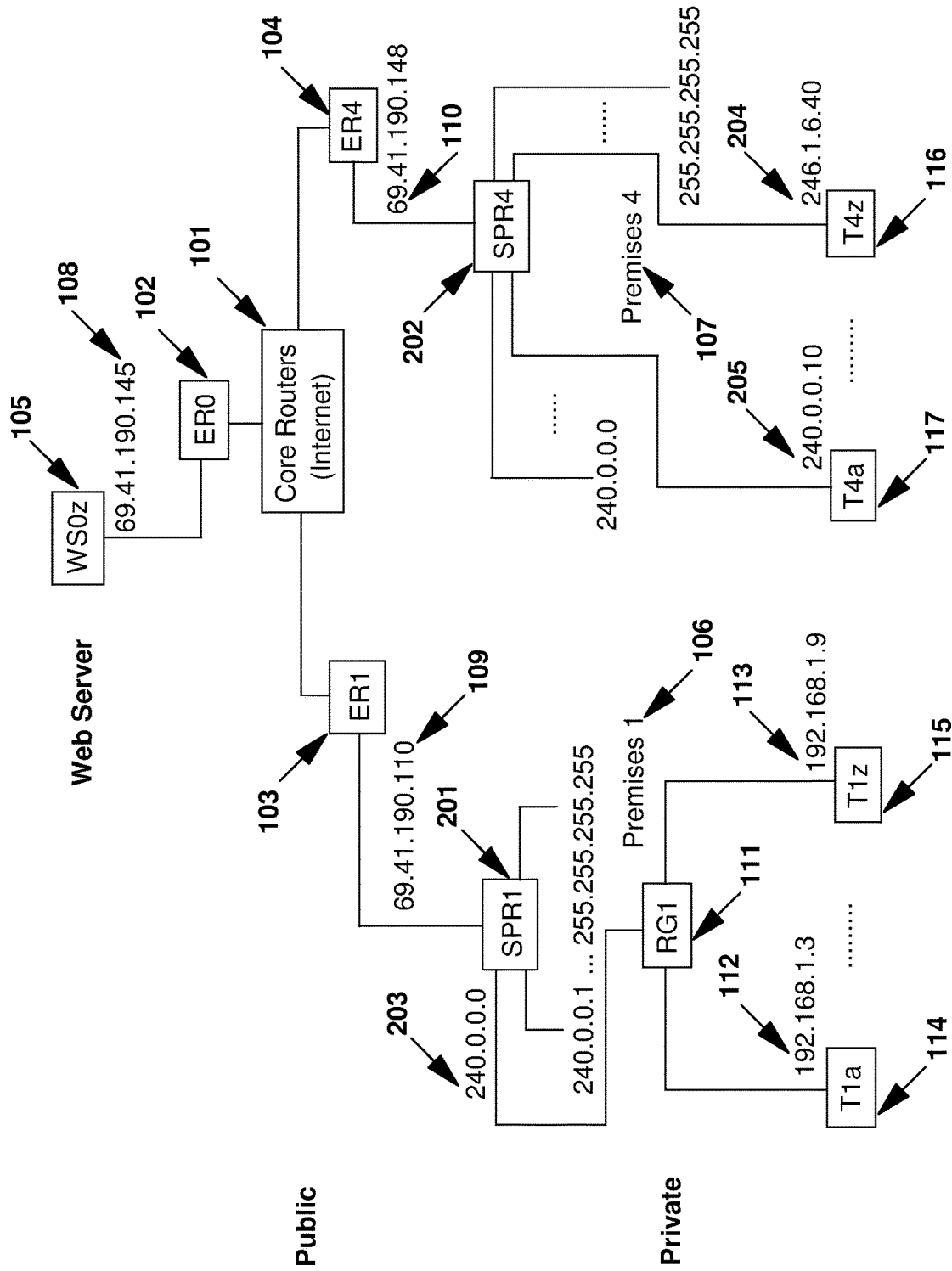
FIG. 2 is the proposed extended Internet architecture, enhanced from FIG. 1 by inserting new category of routers called Semi-Public Router (SPR) between an Edge Router (ER) and a customer Premises (with either a Routing Gateway (RG) or a directly connected IoT), for increasing the referring to effective size of publicly assignable address pool. The SPR terminology is derived from the fact that an ER is a public router while a RG is a private router, and a SPR is a router situated inline between the two. A name EzIP (phonetic for Easy IPv4) is chosen as an abbreviated representation for referring to various aspects of this invention.

First, we will introduce the new category of routers. FIG. 2 is basically a duplicate of FIG. 1, with the addition of Semi-Public Routers (SPR), SPR1 201 between ER1 103 and Premises 1 106, and SPR4 202 between ER4 104 and Premises 4 107. Each of the SPRs makes use of the 256M addresses from 240.0.0.0 through 255.255.255.255 in the 240/4 netblock to expand the public address. This achieves the goal of expanding the capacity of each IPv4 public address by 256M times through assigning public addresses for identifying premises and IoTs.

With this new facility inserted, RG1 111 is now identified with a semi-public address 240.0.0.0 203 assigned by SPR1 201 who assumes the public address 69.41.190.110 109 originally used by ER1 103 to identify RG1 111. The full Internet identification code for RG1 111 is now the concatenation of these two addresses: 69.41.190.110-240.0.0.0.

Similarly, T4z 116 is now identified with a semi-public address, 246.1.6.40 204 assigned by SPR4 202 who assumes the public address 69.41.190.148 110 originally used by ER4 104 to identify T4z 116. The full Internet identification code for T4z 116 is the concatenation of these two addresses: 69.41.190.148-246.1.6.40.

With expanded addressing capability of the SPRs, many more IoTs may be connected to the Internet. For example, T4a 117 is now identified by SPR4 202 with a semi-public address 240.0.0.10 205 to communicate with other IoTs on the Internet. Its full Internet identification code is 69.41.190.148-240.0.0.10.

To transport the extension address data among SPRs so that they can be utilized for directing the additional routing, we must find a mechanism in the existing IPv4 protocol that is capable of supporting this function. We begin with a quick review of the generic IPv4 IP Header format. FIG. 3 is a copy of FIG. 4 in the IETF (Internet Engineering Task Force) standard, RFC791 (Request For Comments). For a packet originated from Premises 1 106 in FIG. 1 to be delivered to Premises 4 107, we would enter addresses 69.41.190.110 109 and 69.41.190.148 110 for Source Host Number 301 (Word 4) and Destination Host Number 302 (Word 5) in FIG. 3, respectively.

To convey the extension address data between SPRs, such as SPR1 201 and SPR4 202, in FIG. 2, while not affecting the existing operations of the Core, Edge and Gateway routers, it is discovered that the options mechanism in the IP Header (part of the "Example 10 Internet Datagram") defined by IETF RFC791 FIG. 9 provides the desired capability. The options mechanism operation principle is that only routers recognizing the meaning of an options word will act upon it. Those who could not do so shall preserve the options word for forwarding it to the next router.

FIG. 4 starts from a copy of FIG. 3, then appended with options Words 6 thru 8 to support the EzIP operation. For a data packet originated from RG1 111 to be delivered to T4z 116 in FIG. 2, Source Host Number 411 (Word 4) and Destination Host Number 412 (Word 5) are filled with addresses 69.41.190.110 109 and 69.41.190.148 110, the same data as those for 301 and 302, respectively, in FIG. 3. The Extended Source No.-1 401, -2 402, -3 403 and -4 404 are filled with extension address 240, 0, 0, and 0, respectively. Similarly, the Extended Destination No.-1 405, -2 406, -3 407 and -4 408 are filled with extension address 246, 1, 6 and 40, respectively.

In operation, a packet with an EzIP Header as FIG. 4 filled with data described above, will be transmitted from RG1 111 through SPR1 201, ER1 103, Core Routers 101, ER4 104 to SPR4 202 according to the Destination Host Number in Word 5 412 in FIG. 4, while the contents of Words 6 thru 8 are not acted upon but preserved. These operations are the same as if the EzIP Header in FIG. 4 were a generic IP Header in FIG. 3. Once the EzIP packet reaches SPR4 202, the data in Extended Destination No.-1 405, -2 406, -3 407 and -4 408 are deciphered to reconstruct the extension addresses 246.1.6.40 204 for additional routing to T4z 116. To reply, the roles of Source and Destination are reversed. T4z 116 will make use of Word 4 411 and data in Extended Source No.-1 401, -2 402, -3 403 and -4 404 as Destination identification codes to construct a new EzIP Header for directing a packet towards RG1 111.

For conciseness and clarity in presenting this invention, certain common Internet practices are not detailed here. For example, instead of providing simple routing service, the Routing Gateway, RG1 111 shown in FIG. 1 and FIG. 2 actually functions like a NAT processor, similar as the CG-NAT provided by ISPs described earlier in this disclosure. Substituting the private addresses, 192.168.1.3 112 or 192.168.1.9 113, a port number is assigned to represent each communication session from an IoT. Consequently, the assigned port numbers instead need be transported as additional IP Header words in both FIG. 3 and FIG. 4 to identify the responsible IoT of a session. However, including the discussion of these port numbers in the IP Header will add burden to the reader without facilitating the appreciation of the incident invention, by distracting the attention. Therefore, we only described the routing process starting from RG1 111, instead of from one of its IoTs, T1a 114 or T1z 115. Similarly, for communications 10 confined within, say SPR4 202, RG1 111 of FIG. 2 in the example would be replaced by T4a 117, and the Source and Destination Host Numbers will become the same 69.41.190.148 110, rendering the information in 411 and 412 unnecessary and duplicated. Consequently, generic IPv4 Header of FIG. 3, for transporting the Extended No.'s as Host Numbers15 in 301 and 302, respectively may be used.

Since IoTs already deployed in the field are not aware of the proposed EzIP scheme, they can only initiate communication sessions with generic IPv4 IP Headers. In addition, it will be a long time before all IoTs are capable of initiating communication with EzIP Headers. To properly handle this expected long duration of transition, the SPRs will operate with a handshake such convention that only data packets with EzIP Headers will receive the true router service disclosed herein. Otherwise, the SPR will provide the equivalent of the CG-NAT service currently being offered by ISPs.

The format proposed in FIG. 4 handles the extension address with full 32 bits. This allows the EzIP scheme to utilize a smaller block of addresses, if desired. Such choice will expand the public address pool with a smaller multiplication factor. For example, if addresses from the 240.1/16 netblock are utilized by an SPR, the multiplication factor will be only 64K, which is the same as the common residential 192.168/16 private networks. This flexibility allows the SPR shown in FIG. 4 to be deployed in smaller modules utilizing various netblock sizes, as well as connected in multiple layers.

On the other hand, the preferred embodiment is based on the prerequisite of not disturbing the IPv4 addresses already allocated. As such, the resultant expanded address pool of 978.7 MB (3.823B×256M) is about 19M times of the forecasted Year 2020 IoT need (50B). This already not only provides enough addresses for the expected need, but also creates a reserve many times over. If such restriction were removed, more public addresses can be reallocated as extension addresses for the EzIP process. The resultant expanded address pool could be even larger. This is because the reallocation of the public address pool to create the extension address is an arithmetic parsing, while the EzIP address assignment is effectively a geometric multiplication, both acting upon the same two subsets of addresses.

For example, if, instead of the 240/4, we reserve the 224/3 netblock with 512M addresses (the second half of this is the 240/4 netblock) to be the extension address, 3.567B (4.079M−512M) will remain in the public address pool. Applying the EzIP process, the expanded address pool becomes 1,826.3 MB (3.567B×512M) which almost doubles the result of the basic 240/4 operation. This trend of increase will continue, until it peaks out when the remaining public address pool equals the reserved extension address pool. That is, reserving one half of the overall IPv4 addresses (31 bit long) as the extension address will retain approximate 2B combination for the public address pool. Applying the reserved extension addresses (also about 2B) thru the EzIP multiplication process will produce an expanded pool of 4BB, which is about 80M times of the forecasted IoT need. This is the largest address pool possible with one step parsing.

In addition, the EzIP technique disclosed herein can be implemented with multiple layers of SPRs using segregated address netblocks. For example, we can parse the 4.096B IPv4 pool into four equal parts, each with approximately 1B addresses. Let the first 1B addresses be used by current Internet public routers, and each of the remaining three 1B addresses be used by one separate layer of SPRs. With all three layers of extension deployed, the total number of publicly assignable addresses will become 1BBBB (1B× 1B×1B×1B). Although the IPv6 address capacity of about 256BBBB (4B×4B×4B×4B) is still 256 times larger, it is not important at this scale of address pools because we already have much more addresses in either approach than the need. The progressive nature of the EzIP approach allows us to have an easy-to-visualize structured numbering plan ready, but only to activate one layer at a time where needed, resulting in an address system that uses fewer address bits in general, instead of starting with an overwhelmingly burdensome numbering system like the IPv6. Also, the layered expansion of the address pool will foster the discipline of systematic administration of the physical location correlated IP address allocation which provides the inherent robustness against intrusion.

Furthermore, the number of layers of SPRs and the sizes of extension addresses allocated to each could be optimized for various considerations. For example, we could reserve 2B addresses for the public routers, with two layers of SPRs sharing equal number of the remaining addresses. The net expanded address pool of this configuration will be only 2BBB (2B×1B×1B). However, the larger basic layer of public address pool provides a finer grain resolution in coding geographical regions into the IP address prefix, confining the initial search area for a suspicious packet. The two layers of SPRs then narrow it further to pinpoint the source.

The full identification code of a concatenated IP address for an IoT under these layered SPR configurations consisting of the basic IPv4 public address followed by several extension addresses served by respective layer of SPR resembles closely to the IDDD (International Direct Distance Dialing) telephone number in the PSTN that starts with a country code, followed by a region (area) code, then a city code, ending with the individual subscriber's telephone number. Along this line of reasoning, the numbering plans of the PSTN and the Internet will begin to mirror each other, or even to merge naturally. Then, similar as the PSTN's ability to locate a caller in real-time, such as the 911 Emergency Caller Location Service in US, the Internet should be able to quickly locate the source of a packet as well, making a perpetrator hard to hide, thus mitigates the root cause to the Cyber Security issues.

I claim:

1. A method, based on operations of parsing a set into two subsets and then multiplying elements of one subset by those of the other subsets, for expanding a public address pool that is based on a finite size numbering system, comprising the steps of:
   1) introducing a new category of router, named Semi-Public Router (SPR) in addition to the existing public router and private router;
   2) identifying a reserved block of address within said finite size numbering system, useable by neither said public router nor said private router, as extension address;
   3) utilizing the existing options mechanism in the Internet protocol header for transporting said extension address;
   4) deploying said SPR inline between an Edge Router and a subscriber premises that it serves; and
   wherein said extension address transported by said options mechanism through said public router and said private router for said SPR to perform an address extension process for expanding said public address pool to be an expanded address pool used to multiply the number of said subscriber premises according to the size of said reserved block of address.

2. The method as recited in claim 1, wherein said options mechanism is transparent to said public router and said private router;
   wherein said extension address is preserved upon transported through said public router and said private router.

3. The method as recited in claim 1, wherein said options mechanism imposes change on neither said public router nor said private router.

4. The method as recited in claim 1, wherein the effect of reducing portion of said public address pool for reallocating to be part of said extension address, pool will be overcompensated by said address extension process in creating said expanded address pool.

5. The method as recited in claim 1, when desired:
   1) said SPR is parsed into several SPR groups;
   2) said extension address is similarly parsed and assigned to each said SPR group;
   wherein said address extension process is performed in successive layers, each provided by one said SPR group, resulting in an overall address pool that will be larger than said expanded address pool.

6. The method as recited in claim 5, wherein said layers can be activated progressively one at a time, where needed.

7. A method, based on operations of parsing a set into two subsets and then multiplying elements of one subset by those of the other subset, for expanding a finite size numbering system based public address pool comprising the steps of:
   1) introducing a new category of router, named Semi-Public Router (SPR) in addition to the existing public router and private router;
   2) parsing said public address pool into two parts, reserving one part as extension address pool, and retaining the balance as reduced public address pool;
   3) identifying a mechanism for transporting said extension address as payload in the Internet protocol header through said public router and said private router;
   4) deploying said SPR inline between a said public router and a subscriber premises that it serves; and
   wherein said extension address is transported by said mechanism through said public router for said SPR to perform an address extension process for expanding said reduced public address pool to be an expanded address pool used to multiply the number of said subscriber premises according to the size of said extension address pool.

8. The method as recited in claim 7, wherein said mechanism is transparent to said public router and said private router;
   wherein said extension address is preserved upon transported through said public router and said private router.

9. The method as recited in claim 7, wherein said mechanism imposes change on neither said public router nor said private router.

10. The method as recited in claim 7, wherein the size of said expanded address pool is the multiplication product of the size of said reduced public address pool and the size of said extension address.

11. The method as recited in claim 7, wherein additional portion of said reduced public address pool can be reallocated to be said extension address, the effect of the further reduction of said reduced public address pool will be overcompensated by said address extension process resulting in a larger said expanded address pool.

12. The method as recited in claim 7, wherein:
   1) said SPRs can be parsed into several SPR groups,
   2) said extension address is similarly parsed and assigned to each said SPR group;
   wherein said address extension process is performed in successive layers, each provided by one said SPR group, resulting in an overall address pool that is larger than said expanded address pool.

13. The method as recited in claim 12, wherein said SPR groups can be activated progressively one at a time, where needed.

* * * * *